(12) United States Patent
Rupsis

(10) Patent No.: US 7,194,071 B2
(45) Date of Patent: Mar. 20, 2007

(54) ENHANCED MEDIA GATEWAY CONTROL PROTOCOL

(75) Inventor: Paul A. Rupsis, Winfield, IL (US)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 09/749,745

(22) Filed: Dec. 28, 2000

(65) Prior Publication Data

US 2003/0009337 A1 Jan. 9, 2003

(51) Int. Cl.
*H04M 11/00* (2006.01)

(52) U.S. Cl. .................. 379/88.16; 379/88.22

(58) Field of Classification Search ............. 379/88.16, 379/88.17, 88.18, 88.22–88.25, 88.27; 704/258, 704/260; 709/230–232, 217, 219
See application file for complete search history.

(56) References Cited

U.S. PATENT DOCUMENTS

| | | | | |
|---|---|---|---|---|
| 5,655,006 | A * | 8/1997 | Cox et al. ................. | 379/67.1 |
| 6,049,765 | A * | 4/2000 | Iyengar et al. ............ | 704/201 |
| 6,181,736 | B1 * | 1/2001 | McLaughlin et al. ....... | 375/222 |
| 6,295,342 | B1 * | 9/2001 | Kaminsky ................ | 379/88.23 |
| 6,400,806 | B1 * | 6/2002 | Uppaluru ................. | 379/88.02 |
| 2003/0009337 | A1 * | 1/2003 | Rupsis ..................... | 704/260 |
| 2003/0140121 | A1 * | 7/2003 | Adams ..................... | 709/219 |

FOREIGN PATENT DOCUMENTS

| | | |
|---|---|---|
| JP | 10-98771 | 4/1989 |
| JP | 01-188154 | 7/1989 |
| JP | 01-209855 | 8/1989 |
| JP | 04-117858 | 4/1992 |
| JP | 05-176060 | 7/1993 |
| JP | 06-334749 | 2/1994 |
| JP | 10-013572 | 1/1998 |
| JP | 10-051403 | 2/1998 |
| JP | 10-136089 | 5/1998 |
| JP | 11-305800 | 11/1999 |
| JP | 00-059511 | 2/2000 |
| JP | 00-184070 | 6/2000 |

OTHER PUBLICATIONS

Cromwell D.: "Proposal for an MGCP Advanced Audio Package" RFC 2897, 'Online! Aug. 2000, pp. 1-34, XP002212513l; Retrieved from the Internet: URL:http://www.ietf.org/rfc/rfc2897.txt; retrieved on Sep. 5, 2002.
ECTF: "S.100 Media Services, revision 2.0—vol. 6" ECTF Standard, 'Online! pp. 175, 213-218, XP002212549; Retrieved from the Internet: URL:http://www.ectf/; 'retrieved Sep. 6, 2002.

(Continued)

*Primary Examiner*—Ovidio Escalanate
(74) *Attorney, Agent, or Firm*—Grossman, Tucker, Perreault & Pfleger, PLLC

(57) ABSTRACT

The exemplary embodiments of the present invention provide ECTF S.100-like functionality for H.248/Megaco-controlled media gateways and/or media servers by defining extensions to several of the H.248/Megaco ARFs, which are permissible within that protocol, to allow terminations within a media gateway more advanced media processing capabilities.

15 Claims, 3 Drawing Sheets

OTHER PUBLICATIONS

Michael Bayer: "Four things to remember", 'Online! Oct. 6, 1999, pp. 34-45, XP002212522; Retrieved from the Internet: URL:www.ctexpert.com/BayeriPR.pdf; 'retrieved on Sep. 5, 2002.

Greene, Ramahalo, Rosen: "Media Gateway Control Protocol Architecture and Requirements"; RFC 2805, 'Online! Apr. 2000, Retrieved from the Internet: URL:http//www.ietf.org/rfc/rfc2805.txt; 'retrieved on Sep. 5, 2002.

Cuervo, Greene, Huitema, Rayhan, Rosen, Segers: "Megaco Protocol version 0.8"; RFC 2885, 'Online! Aug. 2000, pp. 1-170, XP002212515; Retrieved from the Internet: URL:http://www.ietf.org/rfc/rfc2885.txt, 'retrieved on Sep. 5, 2002.

Office Action with English translation from related Japanese application (11pgs).

* cited by examiner

ENHANCED MEDIA GATEWAY CONTROL PROTOCOL

FIELD OF THE INVENTION

The present invention generally relates to communication protocols.

BACKGROUND OF THE INVENTION

Modern telecommunications is frequently carried out over public and private networks comprising a series of points or nodes interconnected by communication paths. Data enters and leaves the network through these nodes. Private networks are often used by businesses and other enterprises to facilitate data and resource sharing and data communication (e.g., electronic-mail and file transferring services) among employees. Local telephone companies (also referred to as local exchange carriers or Public Switched Telephone Networks, (PSTNs)) and long distance service providers (also referred to as inter-exchange carriers) are examples of public networks.

Traditional PSTNs or "legacy" networks are often referred to as Circuit Switched Networks (CSNs) because they utilize circuit switching, i.e., a type of switching in which the communication circuit (or path) for a particular call is dedicated to the call participants. Legacy networks are currently being replaced by packet-switched networks. Packet-switching is a method of data transport that uses relatively small units of data called "packets" to route data through the network based on a destination address contained within each data packet.

Public and private networks carry many types of data including voice and other media (e.g., video data). Current trends in public networks are toward "converged" communications networks, which are networks in which audio and video data are carried using the same method of transport as data applications such as Internet traffic. Increasingly, this method of transport is packet-switched rather than circuit-based.

However, converged communications networks must cooperate with legacy, circuit-switched networks. In general, users of different networks need to send voice and other media (generally referred to herein as "data") to each other. Media gateways can be used for this purpose.

Both the Internet Engineering Task Force (IETF) and the International Telecommunications Unit (ITU) standards bodies have recognized the need for a physically and logically decomposed media gateway architecture in which a relatively intelligent media gateway controller (functioning as a "master" device) controls a relatively unintelligent media gateway (acting as a "slave" device). The media gateway acts as a transcoder between networks. A media gateway and a media gateway controller communicate with each other through a control protocol. The IETF Megaco Working Group and ITU SG16 jointly developed a Megaco/H.248 protocol for this purpose.

DETAILED DESCRIPTION OF THE FIGURES

DETAILED DESCRIPTION OF THE PREFERRED EMBODIMENT

Figure 1:
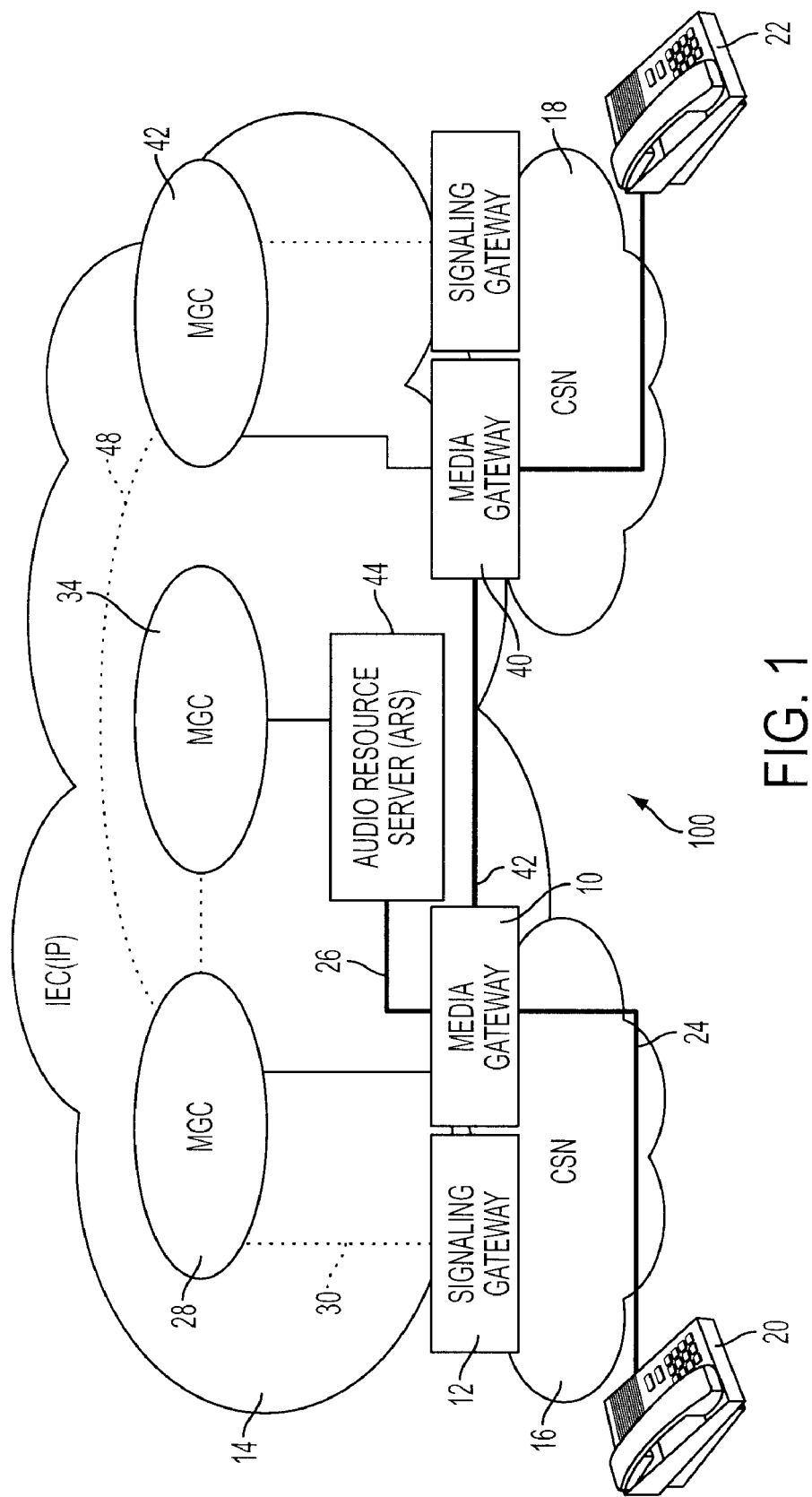
FIG. 1 is a schematic representation of media gateways and media gateway controllers in an exemplary converged communications network.

The H.248/Megaco specification and/or the requirements for the H.248 protocol define the terms "media gateway function", "media gateway" (also called a "media gateway unit"), "media gateway controller" (referred to throughout this disclosure as an "MGC"), "media resource", "termination" and "audio resource function" (referred to throughout this disclosure as an "ARF") as they are used throughout this disclosure.

As a result, of the promulgation of such standards, many media processing components are currently available that support advanced capabilities. It is desirable, therefore, to provide media control protocols to fully exploit the full capabilities of commercially available media processing components. These media control protocols are particularly useful to telecommunications service providers providing media services to the private and public sector.

Many of these commercially available media processing components conform to the Enterprise Computer Telephony Forum (ECTF) S.100 Media Services specification. In general, the S.100 framework provides an extensive definition of media services, which includes playing and recording of audio files and includes speech recognition and text-to-speech technology. However, an ARF implemented according to the H.248/Megaco requirements does not provide sufficient media processing capability to provide these commercially available media processing components.

Therefore, exemplary embodiments of the present invention provide ECTF S.100-like functionality for H.248/Megaco-controlled media gateways and/or media servers by defining extensions which enhance several of the H.248/Megaco ARFs, which are permissible within that protocol, to allow terminations within a media gateway more advanced media processing capabilities.

The H.248/Megaco specification is written to allow the basic functions provided by that protocol to be extended. Extensions to H.248/Megaco functionality are provided by protocol definitions that are referred to as "packages". Examples of protocol definitions that provide the enhanced functionality are included below as a set of "packages". These packages define new properties, signals and events for terminations implementing an ARF that may be controlled by the Megaco/H.248 protocol.

In general, the S.100 framework provides an extensive definition of media services that includes playing and recording of audio data files and includes speech recognition and text-to-speech technology. These packages enable MGCs to control terminations having access to the media functionality available by S.100-conformant media processing resources.

Megaco/H.248 requirements state that an ARF comprises one or more functional modules (e.g., a Play Audio Module (PAM), a Record Audio Module (RAM) or a Text-To-Speech Play Audio Module (TTSPAM)) which can be deployed on a stand alone MG server IVR, intelligent peripheral, speech/speaker recognition unit, an MG, etc. A module, e.g., a PAM, is a logical concept. The actual playing of audio data can be realized, for example, by using the PAM to control digital signal processing (DSP) hardware which may be located either on the MG or on an audio resource server (ARS). In the case of the PAM, the function of this DSP hardware is to play out audio data in response to a request by a caller.

In accordance with the exemplary embodiments of the invention, media processing functionality is provided by enhanced PAMs, TTSPAMs and RAMs.

FIG. 1 illustrates a schematic representation of Media Gateways (MG) 10, 40 and Media Gateway Controllers (MGCs) 28, 34 and 42 in a converged communications network 14. As illustrated in FIG. 1, the MG 10 and Signaling Gateway (SG) 12 terminate a packet-switched network 14, e.g., administered or provided by an interexchange carrier, and a CSN 16. The CSN 16 may be representative of a local phone company (e.g., local exchange carrier). The packet-switched network 14 (e.g., long distance carrier) may be configured to function to transmit a call from the CSN 16 to the CSN 18. The CSN 18 may be representative of, for example, a second local phone company.

The MG 10 may be configured to convert circuit switched voice data received from CSN 16 into packetized voice data for transmission over the packet-switched network 14 and vice versa. The MG 10 may also be configured to route the packetized voice and other audio data to the CSN 18 to complete a call from communication device 20 to communication device 22, of which either or both may be telephones or modems, and vice versa.

The MGs 10, 40 may be physical machines or sets of machines, including both hardware and software, that operate to provide media mapping and/or transcoding functionality between potentially dissimilar networks, one of which is presumed to be a packet, frame or cell based network. For example, an MG might terminate CSN facilities (e.g., trunks, loops, etc.), packetize the media stream, if it is not already packetized, and/or deliver packetized traffic to a packet network. The MG may perform these functions in the reverse order for media streams flowing from the packet network to the CSN. However, MGs are not limited to providing translation between packet/frame/cell based networks and CSNs. Other examples of media resources provided by MGs include conference bridges with all packet s interfaces, Interactive Voice Recognition Units (IVRs), ARFs, or a voice recognition system with a cell interface, codecs, announcements, tones, modems, etc. MGs may also contain software and hardware that enable the functionality associated with an SG.

The IETF and the ITU have recognized that an MG may contain many types of media processing resources. The Megaco/H.248 requirements specification states that an MG is assumed to include the following functionality: the ability to provide reservation and release of resources, the ability to provide state of resources, and media processing, using media resources. These resources provide services such as transcoding, conferencing, IVRs and ARFs. Media resources may or may not be directly part of other resources.

MG 10 and SG 12 facilitate communication and/or cooperation between the packet-switched network 14 and the CSN 16. This cooperation allows for adaptation of the call signaling protocols through SGs, e.g., SG 12, and adaptation of the audio data (typically in the form of a "stream") through MGs, e.g., MG 10.

An Audio Resource Server (ARS) 44 may be provided on or included in the packet-switched network 14 to enable announcements or other automated or semi-automated audio services to facilitate long distance service. For example, if a caller wanted to use a long distance calling card to pay for a phone call between the communication devices 20 and 22, the packet-switched network 14 may route the call from the communication device 20 to the ARS 44. The ARS 44 may be configured such that the caller, using the communication device 20 may interact with components of the ARS 44 to arrange for payment for the phone call.

The audio data on transmission path 24 (from communication device 20 to MG 10) may be circuit-switched and the audio data on path 26 (from MG 10 to ARS 44) may be packet-switched. When the caller using communication device 20 dials a long distance phone number, call signaling may be transmitted over CSN 16. The call signaling may use, for example, an SS7 protocol. SG 12 may receive call signals from the CSN 16 and may send the SS7 signaling to an MGC 28 using, for example, a TCP/IP carrier (or other appropriate protocol). The SG 12 may send this signaling to MGC 28 through packet-switched network 14, which may be, for example, a long distance service provider that provides long distance services for communication device 20. To accomplish this, the call signaling data may be transmitted over path 30 to MGC 28, which may be configured to function as a master device controlling MG 10.

Data may be transmitted on path 32 between the MGC 28 and the MG 10 in accordance with the Megaco/H.248 protocol. In response to the MGC 28 receiving signaling data from the SG 12, the MGC 28 may communicate to the MG 10 that communication device 20 is seeking connection to the ARS 44 and that the MGC 28 has the requisite signaling. In response, the MG 10 may terminate or connect paths 24 and/or 26 and provide the transcoding necessary to convert the circuit-switched audio data on the path 24 into packet-switched audio data on the path 26. MG 10 may then route the packet-switched audio data to the IP address of the ARS 44 (assuming that network 14 uses TCP/IP protocol).

The ARS 44 may be controlled by MGC 34 via commands conforming to the Megaco/H.248 protocol transmitted across path 38. MGC 28 may also signal the MGC 34 using path 36 that the ARS 44 has incoming audio data. The MGC 34 may then instruct the ARS 44 to terminate the packet-switched audio data transmitted from the media gateway 10 to the ARS 44. The MGC 34 may then instruct the ARS 44 to, for example, play and/or record audio data independently of, or in response to, input signals transmitted from communication device 20. After the caller's credit card or other necessary business transaction data is transmitted to ARS 44, the MGCs 28, 34 may disconnect the communication device 20 from the ARS 44 and the MGCs 28, 42 may command the MGs 10, 40, respectively, to cooperate to transmit packet-switched audio data on path 43. Signaling data may be transmitted from MGC 28 to MGC 42 over path 48. MGC 42 commands the MG 40 to communicate the phone call to the communication device 22 over the CSN 18.

ARFs residing on the ARS 44 may provide media services to the caller. An ARF is a logical unit that may perform specified functions, e.g., media play and/or media record. Conceptually, an ARF can be thought of as a collection or set of algorithms that, in cooperation with hardware, perform certain functions based on received commands. An ARF includes one or more functional modules which may be deployed on an MG or on a stand alone server, such as, for example, an IVR, an Intelligent Peripheral, a speech/speaker recognition unit, etc.

An MG may qualify as an Audio Enabled Gateway (AEG) if it performs tasks defined in one or more of the following ARF modules: Play Audio, Dual Tone Multi-Frequency (DTMF) Collect, Record Audio, Speech Recognition, Speaker Verification/Identification, Auditory Feature Extraction/Recognition, or Audio Conferencing. Thus, terminations within an MG can realize an ARF if it supports one or more of those ARF modules.

Figure 2:
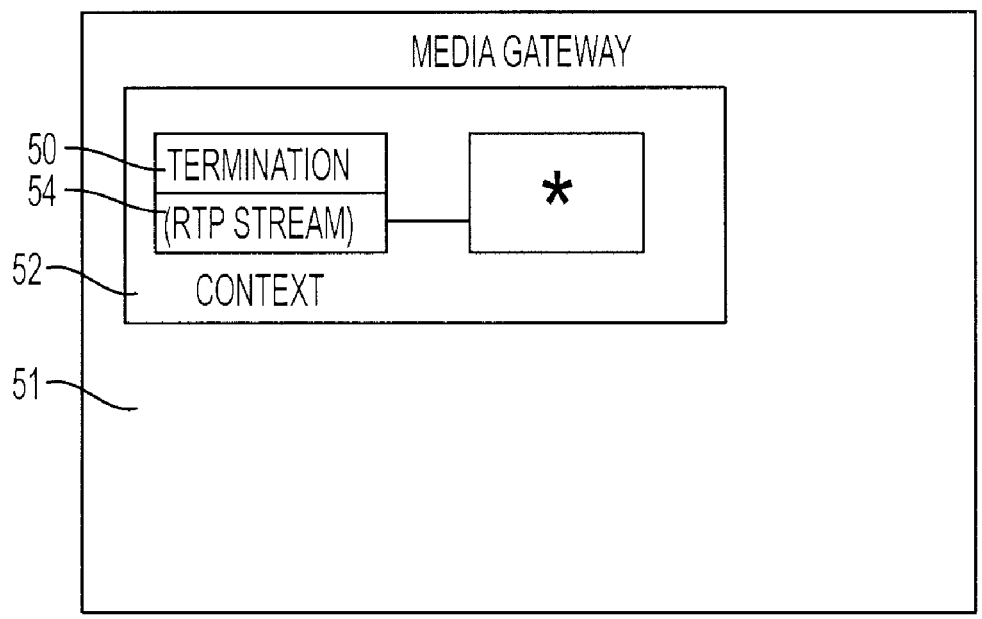
FIG. 2 is a schematic representation of a media gateway context showing a single termination in the context.

An MG 51 may implement one or more terminations 50 as illustrated in FIG. 2. Two or more terminations 50 may be interconnected through contexts 52. A context 52 is a logical concept and represents the space in which one or more terminations 50 are connected. A termination 50 is a point of entry and/or exit of media flows relative to the MG 51. The single termination 50 of FIG. 2 can represent, for example, a player capability associated with a Real-time Transport Protocol (RTP) packet-data stream 54, which is associated with a particular media gateway, so that audio data can be played on the RTP stream 54. In this instance, FIG. 2 represents the identification of a particular player as being the termination of the MG 51.

When an MG is commanded to interconnect two or more terminations, the MG understands how the flows entering and leaving each termination are related to each other. Terminations are also referred to as "bearer points". H.248/Megaco defines the base functionality of gateways, terminations, and contexts.

Figure 3:
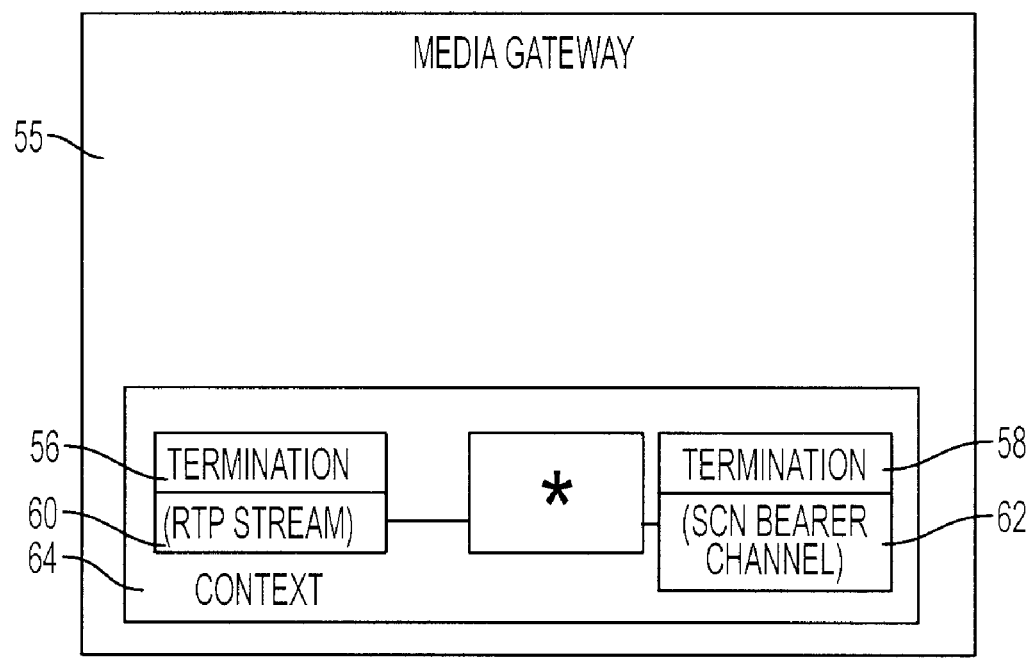
FIG. 3 is a schematic representation of a media gateway context showing two terminations in the context.

FIG. 3 is a schematic representation of two terminations 56, 58 connected in a single context 64. The RTP stream 60 of FIG. 3 may be, for example, packetized voice or other audio data. The termination 58 may be, for example, voice data from a CSN network or channel 62. Therefore, FIG. 3 may represent an MG 55 terminated to a CSN and a packet-switched network. A MG such as MG 55 may provide a transcoding (or adaptation) function if required. A transcoding function may be required, for example, if two interconnected media streams have different characteristics.

Often a converged communications network, such as network 14 illustrated in FIG. 1, is required to support network-based announcements or to support applications that require interactive voice response (e.g., collecting calling card numbers). This may be accomplished by an ARF that is resident either on a centralized ARS located somewhere on the converged communications network or within one or more media gateways.

Figure 4:
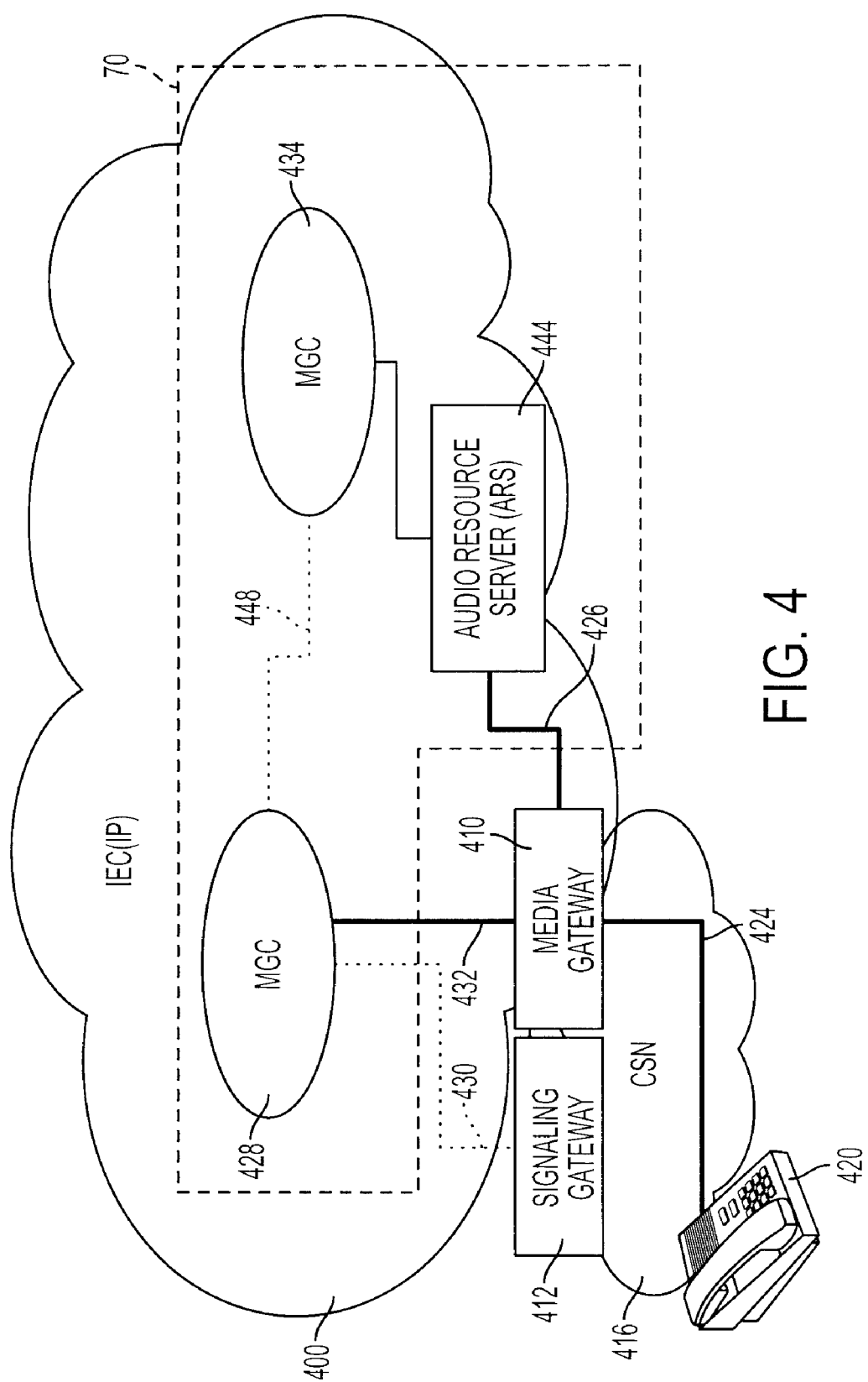
FIG. 4 is a schematic representation of a media gateway and media gateway controller in an exemplary voice portal.

FIG. 4 also illustrates an exemplary converged communications network 400 including two Megaco/H.248-media gateway controllers MGCs 428, 434 and a Megaco/H.248-controlled ARS 444. As shown in FIG. 4, a voice portal 70 within a converged network 400 may be used to provide audio data to an end user via the communication device 420. If, for example, an end user wishes to find the location of the closest restaurant serving a particular type of food, the user may use communication device 420 to interact with the ARS 444 by sending and receiving audio data.

The voice portal 70 may include the MG 410, one or more MGCs 428, 434 and an ARS 444, but may include only MGC 434 and ARS 444. One or more ARFs may be resident on the ARS 444. An ARF implemented on the ARS 444 may include a play audio module, a record audio module, a speech recognition module, and/or a text-to-speech play audio module. The first MGC 428 may cooperate with the SG 412 to transmit signals to the MGC 434 controlling operation of the ARS 444 to indicate that the path 426 should be terminated at the ARS 444.

The MG 410 may transform the CSN audio data into packet-switched audio data and send the packetized audio data to the ARS 444. By virtue of the ARF, the ARS 444 may include many capabilities including, for example, speech recognition, play announcement capabilities and record capabilities to record a message.

The exemplary embodiments of the invention provide and/or enable extensions to several of the H.248/Megaco ARF Modules, which are permissible within the protocol, to allow terminations within a media gateway to have more advanced media processing capabilities.

The IETF and ITU standards bodies, during joint design of the H.248/Megaco protocol, have recognized that MGs may implement terminations that have widely differing characteristics. Therefore, the Megaco/H.248 protocol has been designed to be extensible by allowing terminations to realize, implement and utilize additional properties, events, signals and statistics that are implemented as a set of distinct "packages". Accordingly, the exemplary embodiments of the invention are directed to new packages that provide ARFs with advanced capabilities.

Based on the H.248/Megaco protocol, an ARF designed in accordance with the exemplary embodiments of the invention has many media capabilities. A termination within an MG that implements an ARF can support a package implementing new properties, events, signals, and statistics. The utility of such packages is currently being considered in the ITU-T Study Group 11 as a potential Annex M to the standard. The proposed Annex M provides support for standard IVR operations, e.g., announcement play, digit(s) collect and audio data record. The proposed Annex also supports direct references to simple audio as well as indirect references to simple and complex audio using audio parameters, control of audio interruptibility, digit buffer control, special key sequences and support for reprompting during data collection.

In accordance with a first exemplary embodiment of the invention, an enhanced PAM is configured to be capable of requesting an ARF MG to play the contents of an audio stream container and is configured to be capable of specifying certain play characteristics, e.g., play volume speed, iterations, interval between play iterations and play duration. An audio stream container is an abstract concept for the audio data content to be played by the PAM and is typically a file, but it does not have to be.

Additionally, the enhanced PAM is configured to provide added functionality including the ability to adjust (or "toggle") the speed and the volume of an audio play either through a direct command from the MGC or through an embedded signal within a detected event. Thus, a PAM designed in accordance with the exemplary embodiments of the invention enables publication and implementation of a H.248 Megaco protocol package that can adjust or toggle the speed and/or volume of audio data play based on signals which may be, for example, from a DTMF touch tone phone.

This enhanced PAM may also provide the ability to pause and/or resume an audio data play either through a direct command from the MGC or through an embedded signal within a detected event. The enhanced PAM may further provide the ability to jump forwards or backwards a specified unit of time in an announcement or in a list of announcements either through a direct command from an MGC or through an embedded signal within a detected event. The embedded signals within a detected event may therefore provide run-time control of the enhanced PAM. The enhanced PAM may also provide the ability for the MGC to determine coder types supported by a PAM-enabled termination on the MG and the ability for the MG to report to the MGC the reason an audio play stopped, e.g., play was interrupted by an event or by a replacement signal.

An example is now provided of a package corresponding to an extended PAM designed in accordance with the exemplary embodiments of the invention. This example should provide some further indication of how packages for the enhanced PAM may be written so as to implement the enhanced PAM. The PAM package defined below is based on the Enterprise Computer Telephony Forum (ECTF) S.100 Media Services specification.

The package corresponding to the enhanced PAM may define the properties, signals and events for H.248/Megaco terminations implementing an audio player. The play audio functionality allows transmission of media stream data from a single audio stream container, or sequentially from a list of audio stream containers, on an MG to one of the termination's media streams. An audio stream container is an abstract representation of audio data that has an associated encoding type and clock rate. The audio stream container may be stored on the MG; however, there is no requirement as such. An audio stream container has a default speed and volume at which its data is to be played. The coders supported by a termination's audio player are defined as a termination property.

H.248/Megaco requires that every termination implement some set of packages and that the termination report these packages to an associated MGC. Any termination that implements a particular package, such as, for example, the package corresponding to the enhanced PAM, will have all of the properties enumerated for the package.

The package associated with the enhanced PAM may provide, for the H.248/Megaco terminations that implement it, the functionality associated with a logical audio player having the ability to pause an audio data play and then resume play at the location at which it was paused, to increase or decrease the speed and/or volume of an audio play, and/or to jump forward or backward within an audio stream container or a list of audio stream containers. The capabilities of a termination's logical audio player (e.g., the ability to jump within an audio stream container, range of volume/speed control, etc.) are defined by the termination's properties.

It is worth noting that such a logical audio player may have three conceptual states: idle, paused, and active. In the idle state, the logical audio player is not transmitting any data and has no audio stream container associated with it and is thus equivalent to the absence of any play signal. The logical audio player transitions to the paused or active state in response to a play signal. The transition to the paused state is taken if the pause signal is also included in the signals descriptor with the play signal; otherwise, the transition to the active state is taken.

In the active state, the logical audio player is actively transmitting data from an audio stream container outward from the termination. The logical audio player continues in this state until: (1) it is instructed to pause via a pause signal received from the MGC (or via an embedded signals descriptor associated with a detected event); (2) a replacement signals descriptor is received without a play signal, (3) the signal duration for the play signal expires; or (4) the logical audio player reaches the end of the audio stream container that it is playing (or, if the play was part of a sequential signal list, there are no further play signals in a sequential signal list).

When the logical audio player is active, the MG may receive signals requesting adjustment of the speed or volume of the current play signal.

Alternatively, the MG may receive signals requesting jump forward or backward in the audio stream container currently being played. In each of these cases, the signals descriptor may contain the original play signal with the keep active flag on (described below), or with the same signal list ID if the play function is encoded as a sequential signal list.

In the paused state, the logical audio player is not transmitting audio stream data. The play signal is suspended, not completed. The logical audio player retains its place in the audio stream container being played, so as to be able to resume in the same place if a resume signal is received.

The package associated with the enhanced PAM may have various properties (i.e., a parameter that may be used to store information) including, as properties, pause control, maximum increase of play speed, maximum decrease of play speed, maximum increase in play volume, maximum decrease in play volume, jump control, player coder types, and an audio stream container offset property. Each of these properties is defined in the Termination State descriptor. H.248/Megaco organizes properties into groupings call "descriptors". These descriptors contain properties defined in the H.248/Megaco specification. New properties may be defined in packages to add to the H.248/Megaco-defined descriptors. The properties added to an H.248/Megaco-defined descriptor are named and referenced by a combination of a package name and a property name which follows the format "Package Name/Property Name".

If the pause control property is set to a value of "true", the corresponding logical audio player is able to be paused. As a result, the logical audio player supports the following functions: a) a play signal can start in the paused state when coupled with a pause signal in the signals descriptor and b) when a play signal is in progress, the audio player can be paused or resumed with a replacement signals descriptor with the same play signal (with the keep active flag on) coupled with either a pause and resume signal, respectively. If the pause control property is set to a value of "false", the MGC knows that the enhanced PAM implemented using the package cannot be paused and any pause signal will be ignored. The property is readable by the MGC, but cannot be changed by the MGC. The property enables the MGC to determine whether pausing is enabled.

The maximum increase of play speed property indicates by how much play speed may be adjusted. An adjust speed signal can modify the speed of the audio data play out either up or down. The units by which the speed may be adjusted may be, for example, percentage change from a normal speed. The value of the maximum increase of play speed property is the maximum percentage increase in the play speed allowed. For logical audio players that do not support increasing play out speed, the value of this property may be 0. The maximum increase of play speed property may accept integer type values in the range of 0 to the maximum positive deviation from a default or normal play out speed.

Similarly, the maximum decrease in play speed property indicates the maximum decrease in play speed by, for example, the maximum percentage decrease from the default play out speed allowed. For logical audio players that do not support decreasing speed, the value of the property may be 0. This property is an integer type and has possible values of −100 to 0. These values may, for example, represent the extreme values on a scale the goes from no maximum decrease in play speed (corresponding to the 0 value) to absolute stopping of play (corresponding to the −100 value).

The maximum increase in play volume property indicates how much an adjust volume signal may increase the volume level of audio data play out. The units by which the volume may be adjusted may be in dB from normal or default volume. For logical audio players that do not support increasing volume, the value of this property may be 0.

The maximum decrease in play volume property indicates how much an adjust volume signal may decrease the volume level of audio data play out. The units by which the volume may be adjusted may be in dB from normal or default volume. For logical audio players that do not support decreasing volume, the value of this property may be 0.

The jump control property allows a user listening to an audio data play out to jump forward or backward to either skip a portion or repeat a portion, respectively, of the audio data. An enhanced PAM designed in accordance with the exemplary embodiments of the invention may be able to determine the "location" of the audio data being played at a particular moment relative to the entire audio data within the container being played.

If the jump control property is set to a value of true, then a jump signal received in the active or paused state of the logical audio player may cause the player to move from the current location either forward or backward within the audio stream container or, alternatively, either forward or backward within the sequential signal list of audio stream containers being played. The mode, direction, and unit change are specified as parameters in the jump signal. Jump control is a property that may be set to a value of either true or false. A jump signal can modify the current location within an audio stream container during an active or paused play signal if the property is set to a value of true. If the property is set to a value of false, a play signal cannot have its position altered when active or paused. Thus, any jump signal will be ignored when the property is set to a value of false.

The player coder types property may define the encodings of audio stream containers that a termination's enhanced PAM supports. The player coder types property is a sub-list type having possible values that are a sub-list of the RTP payload types defined by the Internet Assignment Numbering Authority (IANA).

The enhanced PAM package defines a number of "events" including a play started event and a play completion event. Generally, an "event" is any occurrence that is detected on a packet-switched or circuit-switched termination on the MG. For example, an MG could be used to terminate a touch tone telephone directly (instead of, for instance, having the touch tone telephone indirectly connected to the MG via a trunk line from a PSTN). In this situation, possible events include going on hook (picking up the receiver), going off hook (hanging up the receiver), pushing a "hookflash" button or pushing a DTMF key. As another example, if an enhanced PAM of an ARF is realized on an MG through a packet-switched or circuit-switched termination, the MG may detect events associated with the capabilities of the enhanced PAM.

The play started event corresponds to detection of when a play out is started and thereby allows the MG to know when an enhanced PAM has started playing, which may be important for the MG to be aware of because the H.248/Megaco protocol defines and allows what is called an "embedded signal descriptor". In other words, this event may be used to trigger an embedded signals descriptor. To understand an embedded signal descriptor, it is first necessary to understand that the H.248/Megaco protocol defines a "signal" as anything that can be transmitted out to the outside world. The generation of a "ringing tone" sent from an MG to a user's telephone is one example of a signal.

Generally, the embedded signal descriptor in the MG allows the MG to respond to a particular detected event by immediately playing a particular signal.

H.248/Megaco provides a way to encode indication of a particular event to the MG such that when the MG detects the event, the MG immediately and directly responds by playing an appropriate signal. This is generally referred to as an embedded signal descriptor. Use of an embedded signal descriptor may provide increased responsiveness to certain events by eliminating a requirement that the MGC be informed of a detected event by the MG and the MG responds to the event only after the MGC has instructed it to. This latter situation involves greater delay than the former embedded signal situation.

For example, when a play started event is detected, an embedded signal descriptor might be used to immediately start a record event to record what is being said by a person listening to the audio data while the audio data is being played. There are no event parameters associated with this event nor are there any observed event descriptor parameters associated with this event. To understand the significance of this, it must be understood that, generally, when an event is detected and reported, this information is transmitted in a descriptor called observed events. There may be one or more parameters associated with each event in the observed events descriptor, for example, a time stamp indicating the time when an audio play started. This parameter would then be associated with the event described in the observed event descriptor.

Similarly, the play completion event corresponds to detection of when a play out is completed and thereby allows the MGC to know when a PAM has stopped playing. The package may define parameters to the play completion event reported in the observed events descriptor. For example, an audio stream container parameter may specify the audio stream container that was being played at the moment when an audio play sequential signal list was halted or interrupted. Similarly, a termination method parameter may be associated with the play completion event and may have, for example, possible values associated with an expired time out duration, an interruption resulting from a detected event, halting by a new signals descriptors, no completion as a result of another cause, an end of data encountered, or any other reasons why audio data play out may stop. The appropriate reason is returned as a parameter in the play completion event contained in the observed events descriptor. The termination method parameter is equivalent to the termination method parameter in the generic signal completion event with the addition of the end of data reason.

The enhanced PAM package may also provide an audio stream container offset parameter associated with the play completion event, which may specify the location in the audio stream container that was being played when an audio play signal or sequential signal list stopped, e.g., by a time-based offset in milliseconds from the beginning of the play out. Further, the package may also provide an interrupting event ID parameter that may indicate which event stopped play out when the termination method is "EV", indicating that the play was interrupted by an event.

Several signals may be defined in association with the enhanced PAM package, for example, a play signal, a pause signal, a resume play signal, an adjust play speed signal, an adjust play volume signal, and a jump signal.

The play signal extracts data from an audio stream container and may apply an appropriate decoding/transcoding algorithm to the data based on the encoding of the audio stream container and on the information in termination's remote descriptor. The H.248 remote descriptor contains information that describes the properties of the remote end of the packetized RTP media stream. For instance, the properties of the remote end may include the IP address, RTP port number, and encoding type expected to be received by the remote end. If the ARF is unable to decode/transcode the audio stream container, then the signal may fail and error code may be generated.

A list of audio stream containers to be played may be encoded as a sequential signal list. Generally, an audio stream container is a name provided to the MG and corresponds to an abstract concept for the audio data content to be played by the PAM. An audio stream container is typically a file, but it does not have to be. This file may be located, for example, on the ARS, or co-resident on the MG; however, the MG determines where any particular container is located.

The play signal can be of two types: it can be of the time-out type or of the on/off type (e.g., default). These signal types represent H.248/Megaco descriptions of how a signal ends. A time-out signal type indicates that the associated signal is applied for a predetermined time and then the signal is stopped. An on/off signal type is turned on by a specific on signal and it remains in the on state until an off signal is transmitted specifically to turn the signal off. The on/off signal may be used if the play continues until end-of-data is encountered.

The play signal may utilize several additional parameters, for example, the audio stream container parameter, which specifies the audio stream container the signal should play. Additionally, the play signal also utilizes an offset parameter, which functions to specify the offset in the audio stream container (e.g., in milliseconds) at which to start playback. The possible values of the offset parameter are from 0 (default) to the maximum time required to play the audio stream container at normal speed.

H.248 defines a signals descriptor which, when present in a command, instructs the MG to play one or more signals. At any point in time, the MGC may send another command with a potentially different signals descriptor. This is referred to as a replacement signals descriptor. If the same signal appears both in the original signals descriptor and the replacement signals descriptor, this may indicate either (a) restart the signal (this occurs if the keep active flag is not on in the replacement signals descriptor) or (b) continue with the signal (this occurs if the keep active flag is on). The enhanced PAM package may also define a pause signal, which, when present in a replacement signals descriptor with the original play signal (with the keep active flag on), may indicate transition of the play signal to the paused state, thereby halting audio data transmission.

A keep active flag, as defined by events descriptor in base H.248/Megaco, may indicate maintenance of audio data play even though an event is detected during that audio data play. More specifically, typically during audio data play out, the MG remains in a condition to detect events. When an event is detected, play out is stopped by default. However, play out will continue following the detection of an event if the keep active flag in the events descriptor has an on value. In a similar fashion, the H.248/Megaco signals descriptor defines a keep active flag which affects the processing of a signal when a replacement signals descriptor is received. For example, given an audio play signal in progress, if a replacement signals descriptor is subsequently received containing both the original audio play signal and a pause signal, the behavior of the MG depends on the setting of the keep active flag. If the keep active flag is on, the audio data play out is paused, the current location within the audio stream container being played is maintained. The play signal is not complete, but is suspended until another signals descriptor is received containing both the original play signal (with the keep active flag on) and a resume signal or until the play signal duration expires. However, if the keep active flag is off in the replacement signals descriptor, the MG will treat the play signal as a request to restart the play signal, in the paused state, from the beginning of the audio stream container.

The pause signal will pause a sequential list of play signals if the replacement signals descriptor contains both the pause signal and the sequential list of play signals having the same signal list ID as the current signals descriptor. A pause signal may be ignored if: (a) no play signal is active in the current signals descriptor, (b) no play signal is specified in the replacement signals descriptor, (c) the play signal in the current signals descriptor is already in the paused state, or (d) the pause control property is set to a value of false.

The resume play signal, when present in a replacement signals descriptor with a play signal (with the keep active flag on), will transition the play signal to the active state, restarting audio data transmission of data from an audio stream container at the current location. This resume play signal may include a sequential list of play signals if the replacement signals descriptor contains both the resume signal and the sequential list of play signals having the same signal list ID as the current signals descriptor. A resume signal may be ignored if: (a) no play signal is active in the current signals descriptor, (b) no play signal is specified in the replacement signals descriptor, (c) the play signal in the current signals descriptor is already in the active state, or (d) the pause control property is set to a value of false.

The adjust play speed signal, when present in a replacement signals descriptor with a play signal (with the keep active flag on), will adjust the speed of the play signal. The value of that change is specified by the speed change parameter and is expressed in units of percent deviation from normal. This signal may also be used to toggle the current speed between normal and a previously adjusted value or to reset the speed to normal. An adjust play speed signal may be ignored if (a) no play signal is active in the current signals descriptor, (b) no play signal is specified in the replacement signals descriptor, (c) the requested speed adjustment would result in a speed outside the range bounded by the maximum decrease speed and maximum increase speed properties, or (d) if no previous speed adjustments have been made to a play signal and the speed adjustment type parameter is set to normal or toggle speed.

The adjust play speed signal may have various parameters including a speed adjustment type parameter, which specifies the type of speed adjustment by indicating, for example, speed up, speed down, toggle speed, or normal speed. Setting the speed adjustment type parameter to speed up or speed down results in a change in speed, e.g., as a percent deviation from normal. Setting the speed adjustment type parameter to toggle speed causes the speed to toggle to normal if currently at an adjusted value or to the last adjusted value if the current speed is at normal. Another parameter associated with the adjust speed signal is a speed change parameter, which specifies the value of speed change when the speed adjustment type parameter is set to speed up or speed down. This parameter may be ignored if the speed adjustment type parameter is set to toggle speed or normal speed.

The adjust play volume signal, when present in a replacement signals descriptor with a play signal (with the keep active flag on), will adjust the volume of the play signal. The value of that change is specified by the volume change parameter and may be expressed in units of deviation in dB from normal. This signal may also be used to toggle the volume between normal and a previously adjusted value or to reset to normal. An adjust volume signal may be ignored if: (a) no play signal is active in the current signals descriptor, (b) no play signal is specified in the replacement signals descriptor, (c) the requested volume adjustment would result in a volume outside the range bounded by the maximum decrease volume and maximum increase volume properties, or (d) if no previous volume adjustments have been made to a play signal and the volume adjustment type parameter is set to a normal or toggle volume value.

The adjust play volume signal includes various parameters, for example, a volume adjustment type parameter, which specifies the type of volume adjustment and may have the following values: volume up (in dBs), volume down (in dBs), toggle volume or normal volume. As above, specifying toggle volume causes the volume to toggle to normal if currently at an adjusted value or to the last adjusted value if the current volume is at normal. Another parameter, volume change specifies the value of volume adjustment when the volume adjustment type parameter is set to a volume up or down value but is ignored if the volume adjustment type parameter is set to a toggle or normal volume value.

The jump signal, when present in a replacement signals descriptor with a play signal (with the keep active flag on), indicates a jump forward or backward within an audio stream container or a sequential signal list of audio stream containers. The signal specifies the direction of the jump, the units in which the jump is to be performed, and other parameters. A jump signal may indicate a jump within a sequential list of play signals if the replacement signals descriptor contains both the jump signal and the sequential list of play signals having the same signal list ID as the current signals descriptor. A jump signal may be ignored if: (a) no play signal is active in the current signals descriptor; (b) no play signal is specified in the replacement signals descriptor; (c) the jump mode and/or jump unit values indicate a jump within a sequential play signal list and the current play signal is not a sequential signal list; or (d) the jump control property is set to a value of false.

The jump signal has various parameters, e.g., a jump mode parameter, which may have values including: jump list (indicating a jump to the beginning or the end of a sequential signal play list), jump ASC (indicating a jump to the beginning or the end of the current audio stream container), or jump unit (indicating a jump forward or backward some number of units defined by a jump unit type parameter, also specified in the jump signal). The jump mode parameter is ignored if its value is jump list and the audio play signal is not a sequential signal list. Another jump signal parameter is the jump direction parameter, which can have the values jump forward (which may be a default value) or jump backward.

Additionally, the jump signal may also be associated with a jump unit parameter, which may have various values including jump time (which may be a default value and be e.g., a number of milliseconds to jump) or jump ASCs (indicating a number of audio stream containers to jump within a sequential play signal list). If the value of the jump mode parameter is not jump unit, then this parameter is ignored. In association with the jump time value of the jump unit parameter, if the length of a jump would cause the audio play out to come to an end of the current play signal in a sequential signal list, the jump behavior may depend on the encoding type of the next play signal(s) in the sequential signal list. If the encoding of the next audio stream container(s) matches the current encoding, then the jump may continue into the next play signal(s) in the sequential signal list as if they were one object, with the length of the jump accumulated from one audio stream container to the next. If the next play signal is of a different encoding type or if the next signal in a sequential signal list is not a play signal, then the jump may stop at the end of the current play signal. The jump signal may be ignored if the jump unit type parameter is jump ASCs and the current play signal is not a sequential signal list.

The jump signal also utilizes a jump unit value parameter (having an integer value from 0 (default) to 1000000 units), which may be an optional parameter that defines that number of units to jump. If the jump mode parameter is not set to a value of jump unit, then this parameter may be ignored.

Generally, the enhanced PAM will jump if the jump control property is set to a value of true and the enhanced PAM has received a jump signal. The effect of the jump signal depends on the values of the jump parameters. For example, if the enhanced PAM is playing an audio stream container and receives a jump signal and if the value of the jump mode parameter is jump unit, audio play will jump forward or backwards a certain number of units. The jump direction is determined by the value of the jump direction parameter and the amount the play jumps is determined by the values of the jump unit type parameter and the jump unit value parameter. It should also be appreciated that an enhanced PAM may have several containers back-to-back in a particular play and that the jump signal parameters can be set to allow jumps across containers.

The manner in which the enhanced PAM package may be used to provide an interface between an MG and the associated MGC is illustrated below in several examples, which are written in the text version of H.248/Megaco. The examples indicate with brackets where the signal codes and the actual literal values would be contained. The examples further illustrate the protocol that can be transmitted across an H.248/Megaco interface to provide, for example, the play audio function (or other function) within an ARF.

Example 1, shown in the Appendix, corresponds to the MGC directing the MG to play two audio stream containers on a termination and the MG acknowledging the command via a transaction reply. For clarity, the items in single quotes (') are descriptive text and not the literal values that a transaction would have. Example 2, shown in the Appendix, illustrates how an active play signal can be suspended using the pause signal. To resume the play, a replacement signals descriptor with the resume signal is transmitted with the same signal list ID of the original play signal, as shown in Example 3 of the Appendix. Example 4, shown in the Appendix, corresponds to a completion event for the play signal. The completion event for the original play signal is transmitted in a notify command to the MGC upon completion of the second signal in the play sequential signal list. The MGC sends a transaction reply in return.

Example 5 of the Appendix illustrates the use of an embedded signals descriptor within an events descriptor to provide a measure of run-time adjustment over the parameters of an announcement. This example has the MG executing a single play signal with an events descriptor that detects DTMF digits (as defined by the H.248/Megaco DTMF digit package) which will alter the characteristics of the play signal as follows:

DTMF '1' speeds up the play by 5%
DTMF '2' slows down the play by 5%
DTMF '3' returns the play to normal speed.
DTMF '4' increases the volume of the play by 2 dB.
DTMF '5' decreases the volume of the play by 2 dB.
DTMF '6' returns the volume of the play to normal.

DTMF '7' jumps ahead 2 seconds.
DTMF '8' jumps backwards 2 seconds.
DTMF '*' pauses the play
DTMF '#' resumes the play As illustrated in relation to Example 6, when the play completes, a signal completion observed event will be transmitted to the MGC. The MGC will send a reply to the transaction.

In accordance with a second exemplary embodiment of the invention, an enhanced TTSPAM implements the ECTF specification (which defines text-to-speech according to "Speech API SDK: Microsoft Speech API", Version 1.0, 1995, published by the Microsoft Corporation, referred to as the "SAPI") in the H.248/Megaco environment. Thus, the enhanced TTSPAM is configured to enable the ability to generate text-to-speech conforming to the SAPI specification. As a result, the enhanced TTSPAM has various capabilities including the ability to control the pitch of text-to-speech, and other capabilities that the SAPI specification provides.

A package associated with the enhanced TTSPAM may provide functionality associated with a text-to-speech audio player. The TTSPAM package defines the properties, signals, and events for H.248/Megaco terminations implementing a text-to-speech audio player supporting text-to-speech for media encoded either in SAPI format or Telephone Device for the Deaf (TDD) format. Data encoded according to SAPI includes ASCII characters with embedded escape sequences that specify volume, speed, pitch, mode (grapheme or phonetic), or emphasis of a particular word or phoneme.

The package associated with the enhanced TTSPAM extends the enhanced PAM package described above. Accordingly, the description of the extended PAM package, described above, also describes the enhanced TTSPAM package. Thus, all of the play audio definitions from the previous section (e.g., play signal, play completion event, etc.) are all included in the enhanced TTSPAM package with the additional properties listed below that make this package unique.

The enhanced TTSPAM package extends the player coder types property in the enhanced PAM package, e.g., the possible values of the player coder list property in the enhanced PAM package are extended to include SAPI Unicode text complying with SAPI escape sequences. Hence, there are player coder types specified in the enhanced PAM package for playing voice audio. The TTSPAM package extends this capability by providing for new values, e.g., those included in SAPI.

The SAPI specification provides the capability of converting text into speech. SAPI inserts escape sequences into an ASCII text file, which define the pitch, speed and volume of the speech generated from the text. SAPI thus specifies the characteristics of how the text should be "voiced" or played out as speech.

The enhanced TTSPAM package includes, as properties, a text-to-speech loadable dictionary, text-to-speech loadable dictionary list size, text-to-speech loaded dictionaries, text-to-speech languages, text-to-speech active dictionaries, and a text-to-speech player control tags property. Each of these properties is defined in the termination state descriptor.

The text-to-speech loadable dictionary property specifies if the text-to-speech audio player supports loadable user dictionaries. This property can only be set to a value of true if a termination's coder property contains the SAPI value. The property may be set to a value of false otherwise. The dictionaries to load into the enhanced TTSPAM are specified by a loaded dictionaries property.

The text-to-speech loadable dictionary list size property specifies the number of loadable dictionaries that can be loaded simultaneously in the TTS audio player. This property can only be set to a value greater than 0 if the termination's loadable dictionary property is set to a value of true.

The text-to-speech loaded dictionaries property defines whether dictionaries are loaded in the enhanced TTSPAM. The number of user dictionaries that may be loaded simultaneously cannot be more than the value of the dictionary list parameter. If so, an error will be returned in an error descriptor. Loaded dictionaries are not activated automatically. Rather, only those dictionaries specified in the activated dictionaries properties are activated. As such, the value of the activated dictionaries property is a subset of the value of the loaded dictionaries property. This dictionary list property is defined in the termination state descriptor and is a read-write type property. The enhanced TTSPAM package also defines a text-to-speech loaded dictionaries size property, which defines the size in bytes used by the dictionaries that are loaded in the audio player resource for a particular termination.

The text-to-speech languages property defines the languages supported by the dictionaries that are loaded in the audio player resource for a particular termination. This property is define as a sub-list type and its possible values are a sub-list of all the languages defined in ISO 639-2: "Codes for the representation of names of languages: alpha-3 codes", International Organization for Standardization, TC37/SC2-TC46/SC4 Joint Working Group (JWG).

The text-to-speech active dictionaries property defines the dictionaries that are loaded and active in the enhanced TTSPAM for a particular termination. Only those dictionaries specified in the loaded dictionaries property can be specified as values for this property. If a value is specified that is not in the loaded dictionaries property, an error will be returned.

The text-to-speech player control tags property indicates which optional tags are supported by the enhanced TTSPAM. The tags themselves are tags that are embedded in the input text stream and in user dictionaries. Each tag has a corresponding symbol, whose presence in the value of this property indicates that the tag is supported. This property is a sub-list type. The possible values of this property include: Com (embeds a comment in the text; comments are not translated into speech), Dlm (replaces the escape sequence character with a symbol), Emp (emphasizes the next word to be spoken), Pau (pauses speech for the specified number of milliseconds), Pit (sets the baseline pitch of the text-to-speech mode to the specified value in hertz), Prn (indicates how to pronounce text by passing the phonetic equivalent to the player/recorder resource), Rst (resets all escape sequences to the player/recorder resource's default settings), Spd (sets the baseline average talking speed of the text-to-speech mode to the specified number of words per minute), Vol (sets the baseline speaking volume for the text-to-speech mode), Chr (sets the character of the voice), Ctx (sets the context for the text that follows, which determines how symbols are spoken), Mrk (indicates a bookmark in the text), Pro (activates and deactivates prosodic rules, which affect pitch, speaking rate, and volume of words independently of control tags embedded in the text; prosodic rules are applied by the engine), Prt (indicates the part of speech of the next word), and Vce (instructs the engine to change its speaking voice to one that has the specified characteristics).

Various events are associated with the enhanced TTSPAM package including a text-to-speech marker event. The text-to-speech marker event occurs when a text-to-speech Marker has been reached by the enhanced TTSPAM. There are no events descriptor parameters or observed events descriptor parameters associated with this event.

The signals defined by the enhanced TTSPAM package are extensions to the parameters of the play audio jump signal. Specifically, the jump mode parameter is extended to add parameter value jump sentence. The jump sentence parameter value causes a jump to the beginning or the end of the current text sentence. In addition, the jump unit type parameter is extended to add a jump sentence value. This parameter specifies the number of sentences to jump. The jump unit type parameter is also extended to add a jump word value. The jump word value indicates the number of words to jump.

Text-to-speech dictionaries loaded in an enhanced TTSPAM are arranged conceptually as a stack. When input text is processed by the enhanced TTSPAM, the dictionaries are searched in stack order, top-to-bottom, for pronunciation rules. The number of user dictionaries a player may have loaded simultaneously is determined by the value of the dictionary list property. A user dictionary, when initially added to the loaded dictionaries property, is deactivated and must be added to the activated dictionaries property before its rules are used by the player.

In accordance with a third exemplary embodiment of the invention, an enhanced RAM is configured to be capable of requesting an AEG (e.g., an MG) to record audio data. The enhanced RAM is configured to allow the specification of the time to wait for the user to initially speak, the amount of silence necessary following the last period of speech activity for the recording to be considered complete and the maximum allowable length of the recording (including or not including pre- and post-speech silence).

The enhanced RAM (within an ARF) may also enable the ability to pause and resume a recording through a direct command from the MGC or through an embedded signal within a detected event. Other abilities that may be provided by the enhanced RAM include the ability to append a recording to an existing audio data recording, the ability for an MGC to reference where the recording should be created, the ability to eliminate periods of speech inactivity through pause compression, the ability to generate a prompt tone (e.g., a beep) that is either fixed or configurable and the ability to specify the digital encoding format of a recording. Examples of the types of coding used for recording are typically the same as the codings supported by the PAM (e.g., G.711, G.726, G.729, etc.).

The enhanced RAM may also provide the MGC with the ability to determine how much audio data was recorded and why the recording stopped. Recordings can stop for many reasons including, for example, because a predetermined recording period expired, because of speech inactivity, or because recording was interrupted by another event.

An example is now provided of a package corresponding to an extended RAM designed in accordance with the exemplary embodiments of the invention. This example should provide some further indication of how packages for the enhanced RAM may be written so as to implement the enhanced RAM. The enhanced RAM package defined below is based on the Enterprise Computer Telephony Forum (ECTF) S.100 Media Services specification.

A package associated with the enhanced RAM includes the enhanced audio record capabilities discussed above. This enhanced RAM package may be used in virtually the same way as the enhanced PAM package. For example, if a particular termination (such as an ARS) has implemented the enhanced RAM package, then the termination (i.e., the ARS) has the capability of recording incoming packetized speech and entering it into an audio stream container. In addition, the termination may also have the capability of starting a record, of pausing record, of appending a recording onto an existing recording, and so on.

The enhanced RAM package defines the properties, signals, and events for H.248/Megaco terminations implementing an audio recorder. The record audio function captures media stream data from one of the termination's media streams and stores it in an audio stream container. The logical audio recorder may also support the ability to generate a prompt tone immediately before the beginning of a recording.

The enhanced RAM package enables a logical audio recorder to (a) specify a prompt tone in terms of frequency and duration, (b) pause an audio record function and resume it again at the location at which it was paused, (c) append the captured audio stream to the end of an existing audio stream container, (d) compress periods of silence (periods of speech inactivity) in the recorded audio stream and (e) terminate a record audio signal based on a specified duration of speech inactivity. The capabilities of a termination's logical audio recorder (e.g., the ability to compress silence, the ability to suspend/resume recordings, etc.) are defined in the termination's properties.

As with the logical audio player, the logical audio recorder conceptually has three states: idle, paused, and active. In an idle state, the logical audio recorder does not capture any audio stream data and is equivalent to the absence of any record signal. The logical audio recorder transitions to the paused or active state in response to a record signal. The transition to the paused state is taken if the pause signal is also included in the signals descriptor with the record signal; otherwise, the transition to the active state is taken.

In the active state, the logical audio recorder is actively capturing audio stream data that is coming into the termination. It continues in this state until either (a) it is instructed to pause via a pause signal from the MGC (or via an embedded signals descriptor associated with a detected event); (b) a replacement signals descriptor is received without a record signal; (c) the signal duration for the record signal expires; or (d) the duration of speech inactivity exceeds a specified threshold. To pause an active record signal, the replacement signals descriptor must contain the original record signal with the keep active flag on (or with the same signal list ID if the record function was encoded as an item in a sequential signal list).

In the paused state, the logical audio recorder is not capturing audio stream data. The record signal is suspended—not completed. The logical audio recorder retains its place in the audio stream container, so as to be able to resume in the same place if a resume signal is received.

The package associated with the enhanced RAM may have various properties (i.e., a variable that may be used to store information) including pause control, prompt type, prompt duration, prompt frequency, append, compression control, compression enabled, compression threshold, silence termination enabled, silence termination threshold and record coder types properties. Each of these properties is defined in the termination state descriptor.

The pause control property indicates whether the record signal can be paused and resumed. More specifically, if this property is set to a value of true, then the following functions are supported: (a) a record signal can start in the paused state when coupled with a pause signal in the signals descriptor and (b) when a record signal is in progress, it can be paused or resumed when receiving a replacement signals descriptor with the same record signal (with the keep active flag on) coupled with either a pause or resume signal, respectively.

The prompt type property includes an enumeration type value that has the following possible values: none (no prompt is generated prior to the record), fixed (a fixed prompt tone is generated prior to the record) and configured (configurable prompt tone is generated). This property indicates whether the audio recorder can generate a prompt tone immediately before recording. If a prompt tone can be generated, the property further defines whether the tone is fixed or whether it is configurable via the prompt duration and prompt frequency properties.

The prompt duration property specifies the duration of the prompt tone in, for example, milliseconds. The prompt frequency property specifies the frequency of the prompt tone in Hertz. This prompt frequency property can only be set to a value greater than 0 if the prompt type property is set to a value other than none.

The append property indicates whether the recorded audio is to append to the end of an audio stream container or to replace the contents, if any, of the audio stream container. This property thus specifies the behavior of an audio recorder when a record signal is received specifying an audio stream container that already exists.

The compression control property specifies whether the logical audio recorder supports silence compression that removes long pauses in speech activity from the recording. The compression enabled property specifies whether silence compression is enabled. This property can only be set to a value of true if the compression control property is set to a value of true. The compression threshold property specifies the threshold (e.g., in milliseconds) before silence compression is triggered. The value of this property has meaning only if the compression control and compression enabled properties are set to a value of true.

The silence termination enabled property specifies whether the silence in a recording can cause a recording to be terminated when a specified period of speech inactivity is detected. The silence termination threshold specifies the threshold (in milliseconds) of speech inactivity before a recording is terminated. The value of this property has meaning only if the silence termination enabled property is set to a value of true.

The recorder coder types property defines the encodings that the termination's audio recorder resource supports. This parameter takes a sub-list type parameter and its possible values are a sub-list of the encoding names as defined in the IANA list of RTP payload types, originally defined in "Schulzrinne, H. RTP Profile for Audio and Video Conferences with Minimal Control", RFC 1890, January 1996.

The enhanced RAM package defines various events including a record completion event. The record completion event detects when a record signal ends. The event, when loaded for detection in the associated events descriptor, has no parameters. When the event is detected, it is included in the observed events descriptor with a duration parameter, an unsigned integer, which indicates the duration of the recording, in milliseconds, not including the length of time the recorder was in the paused state. Another associated parameter, termination method, accepts an enumeration type and has the possible values: "TO", indicating the recording terminated due to a timer expiration, "EV", indicating an interrupted by an event, "SD", which indicates that the signal was halted by new signals descriptor, "NC", which indicates that the signal was ended as a result of some other cause, and "ST", which indicates a silence termination. This parameter is equivalent to the termination method parameter in the base H.248/Megaco generic signal completion event with the addition of the silence termination reason.

This record completion event also uses a parameter named interrupting event ID that accepts an identifier type value that indicates a termination method. The value "EV" indicates which event stopped the record signal.

The enhanced RAM package defines various signals, including a record signal, a pause signal and a resume play signal.

The record signal captures data from a media stream coming into the termination and places it into an audio stream container. The audio record function captures the media stream using the encoding defined in the termination's local descriptor (default behavior) or transcodes the media stream using a specified encoding algorithm. If the logical audio recorder associated with the enhanced RAM package is unable to transcode the media stream, the signal will fail with an error.

The record signal uses additional parameters including an audio stream container parameter, a coder parameter, minimum duration parameter and a prompt tone parameter. The audio stream parameter specifies the audio stream container to use to capture the media stream coming into the termination. The coder parameter specifies the encoding to use when capturing a termination's incoming media stream into a newly created audio stream container. If the value of this parameter is not contained in the coder list property, an error is returned. This parameter is ignored if the audio stream container parameter references an audio stream container with captured audio of a particular encoding type.

The minimum duration parameter specifies the minimum amount of time a record function captures a media stream in order to be valid. Only valid recordings modify the contents of the audio stream container.

The prompt tone parameter specifies if the record signal will be preceded by a prompt tone as defined by the prompt duration and prompt frequency properties. This parameter has a value of true if a prompt tone is played prior to the record, and has a value of false if no prompt tone is played. This parameter is ignored if the prompt type property is set to none.

The pause signal, when present in a replacement signals descriptor with a record signal (with the keep active flag on), will transition the record signal to the paused state halting capture of the termination's incoming media audio stream. The current location within the audio stream container is maintained. The record signal is not complete, but is suspended until another signals descriptor is received containing both the original record signal (with the keep active flag on) and a resume signal or until the record signal duration expires. A pause signal is ignored if (a) no record signal is active in the current signals descriptor, (b) no record signal is specified in the replacement signals descriptor, (c) the record signal specified in the current signals descriptor is already in the paused state, or (d) the pause control property is set to a value of false. The pause signal has no additional parameters.

The resume play signal, when present in a replacement signals descriptor with a record signal (with the keep active flag on), will transition the record signal to the active state, restarting capture of the termination's media stream into the specified audio stream container at the current location. A resume signal is ignored if (a) no record signal is active in the current signals descriptor, (b) no record signal is specified in the replacement signals descriptor, (c) the record signal in the current signals descriptor is already in the active state, or (d) the pause control property is set to a value of false. The resume play signal has no additional parameters.

While this invention has been described in conjunction with the specific embodiments outlines above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

---

APPENDIX

---

Example 1

```
Megaco/1 [123.123.92.45]:2944              ; IP address/Port of MGC
Transaction = 55500 {
    Context = 'ContextID1' {
        Modify = 'TerminationID1' {
            Events = 'EventRequestID1' {
                playaudio/playcomplete{ } ; Signal Completion
            }
            Signals {
        SignalList = 'SignalListID1' {
            Playaudio/Play {
ASC='AudioStreamContainer1'
            }
            Playaudio/Play {
ASC='AudioStreamContainer2'
            }
        }
    }
            }
        }
}
Megaco/1 [123.123.92.150]:2944             ; IP Address/Port of MG
Reply = 55500 {
    Context = 'ContextID1' {
        Modify = 'TerminationID1' { }
    }
}
```

Example 2

```
Megaco/1 [123.123.92.45]:2944
Transaction = 55501 {
    Context = 'ContextID1' {
        Modify = 'TerminationID1' {
            Signals {
                Playaudio/Pause { },
        ; Reusing 'SignalListID1' is the same as specifying keepActive
            SignalList = 'SignalListID1' {
                Playaudio/Play {
ASC='AudioStreamContainer1'
            }
            Playaudio/Play {
ASC='AudioStreamContainer2'
            }
        }
    }
            }
        }
}
Megaco/1 [123.123.92.150]:2944
Reply = 55501 {
    Context = 'ContextID1' {
        Modify = 'TerminationID1' { }
    }
}
```

Example 3

```
Megaco/1 [123.123.92.45]:2944
Transaction = 55502 {
    Context = 'ContextID1' {
        Modify = 'TerminationID1' {
Signals {
                Playaudio/Resume { },
        ; Reusing SignalListID1 is the same as specifying keepActive.
            SignalList = 'SignalListID1' {
                Playaudio/Play {
ASC='AudioStreamContainer1'
            }
            Playaudio/Play {
ASC='AudioStreamContainer2'
            }
        }
    }
}
```

APPENDIX-continued

```
            }
        }
}
Megaco/1 [123.123.92.150]:2944
Reply = 55502 {
    Context = 'ContextID1' {
        Modify = 'TerminationID1' { }
    }
}
```
Example 4

```
Megaco/1 [123.123.92.150]:2944
Transaction = 55503 {
    Context = 'ContextID1' {
        Notify = 'TerminationID1' {
            ObservedEvents = 'EventRequestID1' {
    20000301T22020002:PlayAudio/PlayComplete { ; Timestamped event
        TermMethod = EOD,
        ASC='AudioStreamContainer2',
        Offset=10000         ; AudioStreamContainer2 played 10 secs of data
    }
}
        }
    }
}
Megaco/1 [123.123.92.45]:2944
Reply = 55503 {
    Context = 'ContextID1' {
        Notify = 'TerminationID1' { }
    }
}
```
Example 5

```
Megaco/1 [123.123.92.45]:2944
Transaction = 55600 {
    Context = 'ContextID1' {
        Modify = 'TerminationID1' {
            Media { TerminationState{Buffer = Off} } ; Ensure no event buffering
            Events = 'EventRequestID2' {
                Playaudio/playcomplete{ }, ; Play Completion Event
                dd/d1 {         ; Detect DTMF Digit '1' Event
        Embed { ; Speed up Current Play by 5%
Signals{
    playaudio/AdjustSpeed{ChangeType=SpeedUp, SpeedChange=5},
    playaudio/Play{ASC='AudioStreamContainer1', keepActive}
}
                }
            }
                dd/d2 {         ; Detect DTMF Digit '2' Event
        Embed { ; Slow down Current Play by 5%
Signals{
    playaudio/AdjustSpeed{ChangeType=SpeedDown, SpeedChange=5},
    playaudio/Play{ ASC='AudioStreamContainer1', keepActive}
}
                }
            }
                dd/d3 {         ; Detect DTMF Digit '3' Event
        Embed { ; Return play to normal speed
Signals{
    playaudio/AdjustSpeed{ChangeType=NormalSpeed},
    playaudio/Play{ ASC='AudioStreamContainer1', keepActive}
}
                }
            }
                dd/d4 {         ; Detect DTMF Digit '4' Event
        Embed { ; Increase play volume by 2dB
Signals{
    playaudio/AdjustVolume{ChangeType=VolumeUp,VolumeChange=2},
    playaudio/Play{ ASC='AudioStreamContainer1', keepActive}
}
                }
            }
                dd/d5 {         ; Detect DTMF Digit '5' Event
        Embed { ; Decrease play volume by 2dB
Signals{
    playaudio/AdjustVolume{ChangeType=VolumeDown,VolumeChange=2},
    playaudio/Play{ ASC='AudioStreamContainer1', keepActive}
}
                }
```

APPENDIX-continued

```
                }
                    dd/d6 {         ; Detect DTMF Digit '6' Event
            Embed { ; Return to normal volume
Signals{
    playaudio/AdjustVolume{ChangeType=NormalVolume},
    playaudio/Play{ ASC='AudioStreamContainer1', keepActive}
}
                    }
                }
                dd/d7 {         ; Detect DTMF Digit '7' Event
            Embed { ; Jump ahead 2 seconds (specified in ms)
Signals{
    ;The default jump signal is to jump forward in time units
    playaudio/Jump{
JumpMode=JumpUnit, JumpDirection=Forward,
JumpUnitType=JumpTime, JumpUnitValue=2000
    },
    playaudio/Play{ ASC='AudioStreamContainer1', keepActive}
}
                    }
                }
                dd/d8 {         ; Detect DTMF Digit '8' Event
            Embed { ; Jump backward 2 seconds
Signals{
    playaudio/Jump{
JumpMode=JumpUnit, JumpDirection=JumpBackward,
JumpUnitType=JumpTime, JumpUnitValue=2000},
    playaudio/Play{ ASC='AudioStreamContainer1', keepActive}
}
                    }
                }
                dd/ds {         ; Detect DTMF Digit '*' Event
            Embed { ; Pause the play
Signals{
    playaudio/Pause{ },
    playaudio/Play{ ASC='AudioStreamContainer1', keepActive}
}
                    }
                }
                dd/do {         ; Detect DTMF Digit '#' Event
            Embed { ; Resume the play
Signals{
    playaudio/Resume{ },
    playaudio/Play{ ASC='AudioStreamContainer1', keepActive}
}
                    }
                }
            Signals { ; Start the Play of TVMObject1
        playaudio/Play {
ASC='AudioStreamContainer1'
            }
        }
    }
                }
            }
    }
Megaco/1 [123.123.92.150]:2944
Reply = 55600 {
    Context = 'ContextID1' {
        Modify = 'TerminationID1' { }
    }
}
Example 6

Megaco/1 [123.123.92.150]:2944
Transaction = 55601 {
    Context = 'ContextID1' {
        Notify = 'TerminationID1' {
            ObservedEvents = 'EventRequestID2' {
    20000301T22040002:playaudio/playcomplete { ; Timestamped event
        TermMethod = EOD,          ; Play terminated because of End of Data
        ASC='AudioStreamContainer1',
        Offset=60000            ; AudioStreamContainer1 played for 60 seconds
}
}
        }
            }
    }
}
Megaco/1 [123.123.92.45]:2944
```

APPENDIX-continued

```
Reply = 55601 {
    Context = 'ContextID1' {
        Notify = 'TerminationID1' { }
    }
}
```

What is claimed is:

1. A record audio module configured to be included in an audio resource function, comprising:
   an audio record process operable to request a decomposed media gateway to record an audio stream in response to a received signal,
   wherein media recording is altered based on at least one signal traveling between the record audio module and the decomposed media gateway and a resultant media recording is analyzed as to a reason it terminated;
   an audio stream container offset parameter to specify a location in an audio stream container that was being recorded when the recording was terminated; and
   a pause compression process operable to detect and to eliminate periods of speech inactivity from a recording.

2. A record audio module as defined in claim 1, further comprising a record pause and resume process operable to pause audio record in response to a record pause request and to thereafter resume the audio record in response to a resume record request.

3. A record audio module as defined in claim 1, further comprising an append process operable to append a recording to an existing recording.

4. A record audio module as defined in claim 1, further comprising a format specifying process operable to specify the digital encoding format of a recording.

5. A record audio module as defined in claim 1, further comprising a recording location process operable to allow the decomposed media gateway to reference where the recording should be created.

6. A record audio module as defined in claim 1, further comprising a record prompt tone generation process operable to generate a prompt tone that is either fixed or configurable.

7. A record audio module as defined in claim 1, further comprising a record analysis process operable to determine the length of audio recorded and to identify a record termination condition that caused a recording operation to stop.

8. A method of recording an audio stream, comprising:
   providing a record audio module included in an audio resource function that is resident on an audio resource server, said record audio module having a record audio process;
   communicating a request signal to the record audio process;
   requesting a decomposed media gateway to record in an audio stream container an audio stream in response to the request signal communicated to the record audio process;
   altering media record based on at least one signal communicated between the record audio module and the decomposed media gateway;
   analyzing a resultant recording as to a reason it terminated; and
   specifying a location in the audio stream container that was being recorded when the recording was terminated,
   wherein the altering includes providing a pause compression process and operating the pause compression process to eliminate periods of speech inactivity from a recording.

9. A method of recording an audio stream as defined in claim 8, wherein the altering includes providing a record pause and resume process and operating the record pause and resume process to pause audio record in response to a record pause request and to thereafter resume the audio record in response to a resume record request.

10. A method of recording an audio stream as defined in claim 8, wherein the altering includes providing an append process and operating the append process to append a recording to an existing recording.

11. A method of recording an audio stream as defined in claim 8, wherein the altering includes providing a format specifying process and operating the format specifying process to specify the digital encoding format of a recording.

12. A method of recording an audio stream as defined in claim 8, wherein the altering includes providing a recording location process and operating the recording location process to reference where the recording should be created.

13. A method of recording an audio stream as defined in claim 8, wherein the altering includes providing a record prompt tone generation process and operating the record prompt tone generation process to generate a prompt tone that is either fixed or configurable.

14. A method of recording an audio stream as defined in claim 8, wherein the analyzing includes providing a record analysis process and operating the record analysis process to determine the length of audio recorded.

15. A method of recording an audio stream as defined in claim 8, wherein the analyzing includes providing a record analysis process and operating the record analysis process to identify a record termination condition that caused a recording operation to stop.

* * * * *